E. MYERS.
CHURN.
APPLICATION FILED JAN. 14, 1913.

1,069,571.

Patented Aug. 5, 1913.

Witnesses:
Christ Feinle, Jr.
James P. Koehl

Inventor,
Elbert Myers.
By Victor J. Evans,
Attorney.

UNITED STATES PATENT OFFICE.

ELBERT MYERS, OF ALBERTA, LOUISIANA.

CHURN.

1,069,571.

Specification of Letters Patent.  Patented Aug. 5, 1913.

Application filed January 14, 1913. Serial No. 741,983.

*To all whom it may concern:*

Be it known that I, ELBERT MYERS, a citizen of the United States, residing at Alberta, in the parish of Bienville and State of Louisiana, have invented new and useful Improvements in Churns, of which the following is a specification.

This invention relates to churns.

A feature of the invention is the provision of agitators which are fixedly mounted in the churn receptacle and disposed in the direct path of reciprocating dashers and arranged to coöperate therewith in such manner as will maximize the churning efficiency of the structure.

With the above and other objects in view, the invention consists of certain novel features of construction, combination and arrangement of parts, as will be hereinafter described and claimed.

Figure 1:
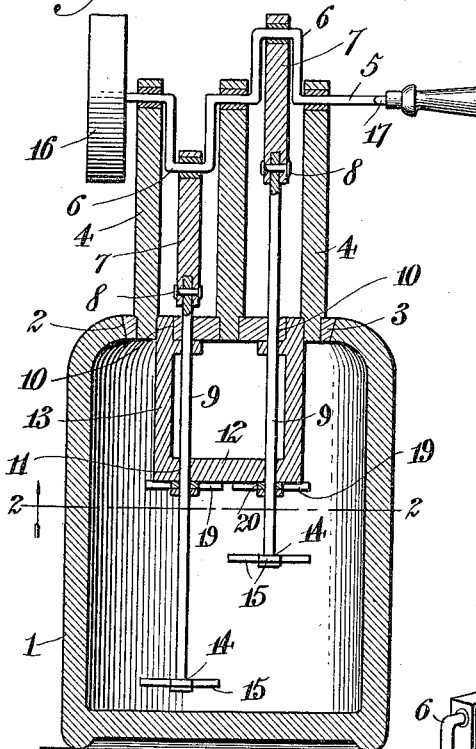
Figure 2:
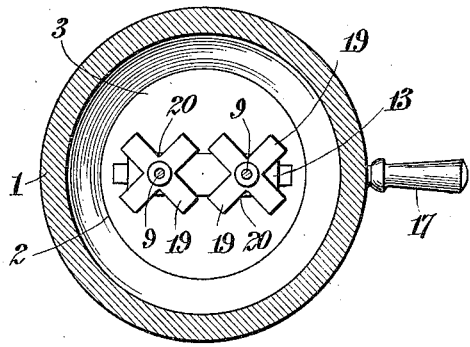
Figure 3:
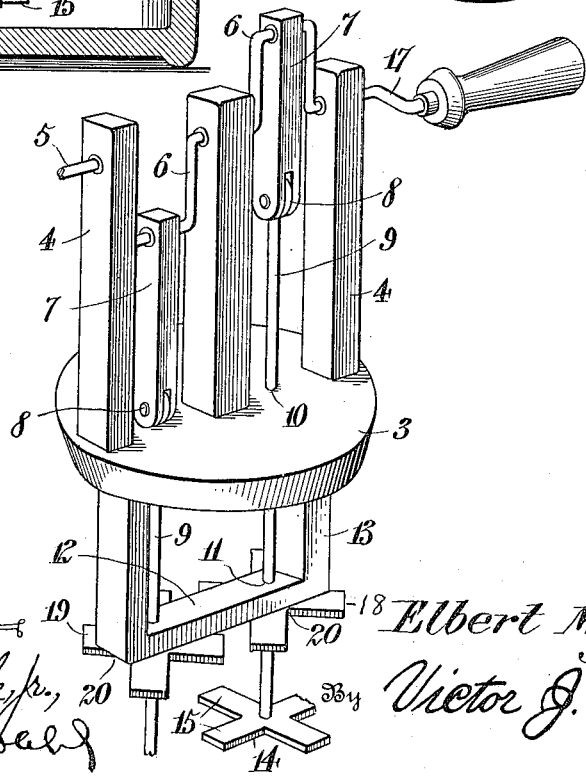

In the accompanying drawings:—Figure 1 is a vertical section through the churn; Fig. 2 is a horizontal section on line 2—2 of Fig. 1, looking in the direction of the arrow; and Fig. 3 is a perspective view of the dasher.

The churn comprises a receptacle 1 whose upper end is provided with an opening 2 to accommodate a cover 3. This cover is provided at diametrically opposite points with vertically rising standards 4, in which an operating shaft 5 is journaled. The shaft is provided with oppositely extending crank portions 6, to which the upper ends of links 7 are connected. The lower ends of the links are pivotally fastened at 8 with the upper ends of vertically reciprocating dasher rods 9. The dasher rods are slidable in guide passages 10 in the cover 3 and in passages 11 in the lower bar 12 of a frame 13 upon the under side of the cover. The lower ends of the dasher rods 9 have fixedly secured thereon paddles or dasher heads 14 having a plurality of radial arms 15. The crank shaft is provided at one end with a relatively heavy fly-wheel 16, while the opposite end of the shaft is provided with a crank handle 17, which may be manually operated to reciprocate the dashers.

With a view to maximizing the churning efficiency of the structure, I provide fixed agitators 18 beneath the cross bar 12. These agitators are disposed directly in the path of the heads or dashers 14 and as shown they are provided with arms 19, which are arranged in outwardly diverging relation so as to form intervening substantially V-spaces 20 therebetween and directly above the arms 15 of the dasher heads 14, so that the liquid disturbed by the dashers 14 in the upward movements of said dashers will be deflected in the direction of the recesses 20 and subjected to the action of the arms 19 and thereby thoroughly agitated.

From the foregoing description, taken in connection with the accompanying drawings, the construction and operation of the invention will be readily understood without requiring a more extended explanation. Various changes in the form, proportion and the minor details of construction may be resorted to without departing from the principle or sacrificing any of the advantages of this invention, as claimed.

Having thus described my invention what I claim is:—

A churn comprising a receptacle having a cover removably fitted thereto, a bracket depending from the cover and extending into the receptacle, opposite reciprocating dashers carried by the cover and having rods slidable in the bracket, and agitators secured beneath the bracket and disposed in the path of said dashers and including spaced radial arms, the dashers also including spaced radial arms and arranged with their arms underlying the spaces between the agitators.

In testimony whereof I affix my signature in presence of two witnesses.

ELBERT MYERS.

Witnesses:
S. N. CLOUD,
O. E. CLOUD.